(12) United States Patent
Huseth et al.

(10) Patent No.: US 10,588,173 B2
(45) Date of Patent: Mar. 10, 2020

(54) WI-FI MESH FIRE DETECTION SYSTEM

(75) Inventors: Steve Huseth, Plymouth, MN (US);
Patrick Gonia, Maplewood, MN (US);
Andrew G. Berezowski, Wallingford, CT (US); Soumitri Kolavennu, Blaine, MN (US)

(73) Assignee: Honeywell International Inc., Morris Plains, NJ (US)

( * ) Notice: Subject to any disclaimer, the term of this patent is extended or adjusted under 35 U.S.C. 154(b) by 830 days.

(21) Appl. No.: 13/531,181

(22) Filed: Jun. 22, 2012

(65) Prior Publication Data
US 2013/0342347 A1    Dec. 26, 2013

(51) Int. Cl.
*H04W 84/18*     (2009.01)
*H04W 92/20*     (2009.01)
*H04L 12/707*    (2013.01)

(52) U.S. Cl.
CPC .............. *H04W 84/18* (2013.01); *H04L 45/24* (2013.01); *H04W 92/20* (2013.01)

(58) Field of Classification Search
CPC ........ H04W 84/18; H04W 92/20; H04L 45/24
USPC ........................................... 370/254
See application file for complete search history.

(56) References Cited

U.S. PATENT DOCUMENTS

2006/0268804 A1* 11/2006 Kim ...................... H04W 48/12
370/338
2006/0291408 A1* 12/2006 Huang .............. H04W 52/0225
370/311
2007/0147332 A1* 6/2007 Lappetelainen ...... H04W 74/06
370/346
2007/0250713 A1* 10/2007 Rahman et al. .............. 713/171
2007/0258508 A1* 11/2007 Werb .................... H04W 84/18
375/140
2008/0040509 A1* 2/2008 Werb .................... H04W 84/18
709/242

(Continued)

FOREIGN PATENT DOCUMENTS

CN        102461079 A     5/2012
CN        102474433 A     5/2012
(Continued)

OTHER PUBLICATIONS

Zenon Chaczko, Fady Ahmad, Wireless Sensor Network Based System for Fire Endangered Areas, 2005, IEEE, vol. 2 pp. 203-207.*

(Continued)

*Primary Examiner* — Ajit Patel
*Assistant Examiner* — Wilfred Thomas
(74) *Attorney, Agent, or Firm* — Brooks, Cameron & Huebsch, PLLC

(57) ABSTRACT

A Wi-Fi mesh fire detection system and methods therefor are provided. The system can include a plurality of access points, where each access point in the plurality of access points is wirelessly connected to at least two other access points in the plurality of access points. For example, a first access point can be assigned as a primary parent device to a third access point, and a second access point can be assigned as a secondary parent device to the third access point. The third access point can transmit a message to the secondary parent device when the third access point fails to confirm that the primary parent device successfully received the message transmitted by the third access point.

15 Claims, 3 Drawing Sheets

(56) References Cited

U.S. PATENT DOCUMENTS

| | | | |
|---|---|---|---|
| 2008/0232344 A1* | 9/2008 | Basu | G01D 9/005 370/350 |
| 2009/0147714 A1* | 6/2009 | Jain | H04W 52/0216 370/311 |
| 2009/0268674 A1* | 10/2009 | Liu et al. | 370/329 |
| 2010/0128630 A1* | 5/2010 | Barak | H04B 7/0417 370/254 |
| 2010/0177684 A1* | 7/2010 | Kore et al. | 370/328 |
| 2011/0051645 A1* | 3/2011 | Hong | H04L 45/48 370/311 |
| 2011/0188434 A1* | 8/2011 | Rhee | H04L 12/12 370/311 |
| 2012/0117268 A1* | 5/2012 | Shaffer et al. | 709/238 |
| 2015/0078256 A1* | 3/2015 | Van Wyk | H04L 47/365 370/328 |

FOREIGN PATENT DOCUMENTS

| | | |
|---|---|---|
| WO | 2008/022059 A2 | 2/2008 |
| WO | WO 2008/022059 A2 | 2/2008 |

OTHER PUBLICATIONS

Yu-Chee Tseng, Chih-Shun Hsu and Ten-Yueng Hsieh, Power Saving Protocols for IEEE 802.11-Based Multi-Hop Ad Hoc Networks, 2002, IEEE, vol. 1, pp. 200-209.*

Stephen Cass, Viva Mesh Vegas, Jan. 2005, IEEE Spectrum, 48-53.*

Search Report for corresponding EP application 13169268.3, dated Jul. 31, 2013.

First Office Action for corresponding CN patent application 201310248859.X, dated Jul. 18, 2017.

English-language translation of First Office Action for corresponding CN patent application 201310248859.X, dated Jul. 18, 2017.

English-language translation of Abstract for CN patent publication 102461079, dated May 16, 2012.

English-language translation of Abstract for CN patent publication 102474433, dated May 23, 2012.

* cited by examiner

WI-FI MESH FIRE DETECTION SYSTEM

FIELD

The present invention relates generally to fire detection systems. More particularly, the present invention relates to Wi-Fi mesh fire detection systems.

BACKGROUND

Many fire control systems use wireless technology to connect the various devices of the system, and the use of such wireless technology provides many advantages. First, installation costs can be reduced when wireless technology is employed in fire control systems. For example, wires need not be pulled through ceilings and walls as is required in a wired installation.

Second, sensors and appliances in the fire control system can be placed in the most appropriate places in a building rather than in places where wires can be most easily placed. This advantage is especially critical in structures that are difficult to wire, such as historic buildings, hospitals, and buildings with heavy walls.

Finally, devices in the fire control system that employ wireless technology can be automatically configured. Further, the devices can use various methods of wireless localization to establish their own unique identifier based on their placement in a building.

Despite the many advantages of fire control systems that employ wireless technology, including those described above, wireless fire systems are often perceived to be less reliable than wired systems. This is true even though fire control systems that employ wired technology carry the risk of the wires becoming damaged or cut. Thus, careful attention must be paid to the robustness and reliability of wireless fire systems.

Many solutions have been proposed to wirelessly connect sensors in fire control systems. For example, many proposed solutions have used proprietary radios and protocols to connect a fire control panel or wired gateway to sensors in the fire control system. However, these solutions often require mounting and connecting access points as well as maintaining a proprietary radio network that supports the fire system.

Accordingly, there is a continuing, ongoing need for an improved wireless network for use in fire control systems.

DETAILED DESCRIPTION

Figure 1:
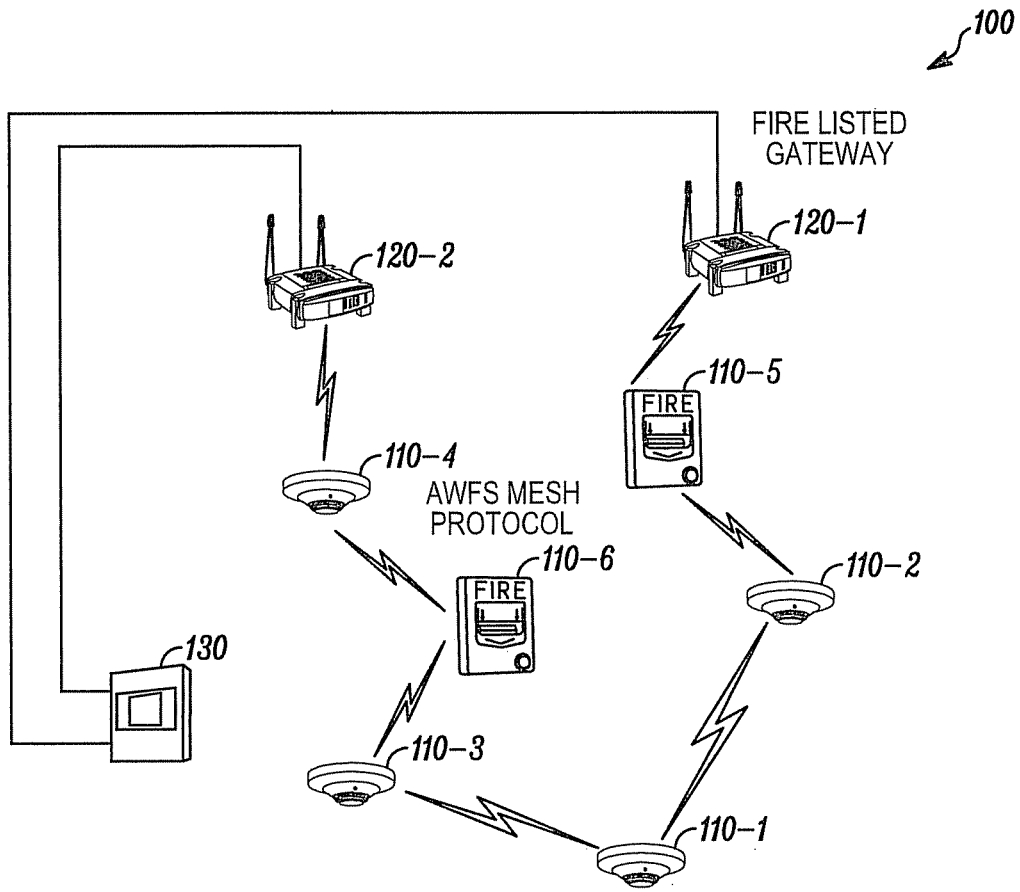
FIG. 1 is a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

802.11 Wi-Fi networks, have become broadly accepted and highly available. Accordingly, embodiments disclosed herein include a wireless network that employs 802.11 enabled hardware and/or software. The 802.11 enabled hardware and/or software can construct a highly reliable fire detection system that is capable of relaying signals from sensors and pull stations to a fire panel and from the fire panel to actuation or enunciator devices.

In some embodiments, existing 802.11 hardware and PHY and MAC software can be used with to construct a time synchronized wireless network of fire sensors and actuators. This network can provide redundant, highly reliable communication from sensors and pull stations to a control panel and from the control panel to actuation and enunciator devices.

According to disclosed embodiments, the robustness of the system can be enhanced because each appliance can be provided with dual connectivity. For example, a multi-hop mesh network can physically separate wireless access points (AP) connected to a fire control system panel. Then, any failure in one route to the fire control panel can be mitigated by sending a signal through a second wireless connection via a second access point.

A wireless fire control system in accordance with embodiments disclosed herein can use standard and/or known 802.11 radios (PHY and MAC layers), that is, radios that are adapted to communicate compliant with the IEEE 802.11 standard, to provide a wireless mesh network that provides at least two routes for messages, information, and data to be sent. Accordingly, a failure in any node along the route to the fire control panel can be mitigated by sending the message to a secondary node in the network.

Each access point, for example, sensor, pull station, and actuator, in the wireless fire control system disclosed herein can maintain at least two connections to two physically separate receivers, that is, other access points, connected to a fire control panel. In some embodiments, each sensor, pull station, and actuator can be monitored to ensure that all connections are functioning properly.

In some embodiments, the battery life of each sensor, pull station, and/or actuator can be managed. For example, the network in accordance with disclosed embodiments can be time synchronized so that each device transmits and receives alarm signals and/or status messages at precise time intervals. At all other times, the devices can remain in a low power sleep state in which the devices conserve power, thus extending battery life.

FIG. 1 is a system 100 in accordance with disclosed embodiments. As seen in FIG. 1, the system 100 can include a plurality of wireless access points 110 that include sensors 110-1, 110-2, 110-3, 110-4 and pull stations 110-5, 110-6. Each wireless access point can include an 802.11 a/b/g/n radio that registers with two other parent devices. Thus, a mesh network can be formed for routing messages from the access point 110-1, 110-2, 110-3, 110-4, 110-5, 110-6 to a fire control panel 130 via a router 120-1 or 120-2.

In some embodiments, redundant parents can be assigned to each access point during the start-up of the system 100. This link level redundancy can improve reliability of the system.

When one of the wireless access points, for example, 110-1, has an alarm message or status message to send, that wireless access point 110-1 can send the message to the primary parent device, for example, 110-2, along the next hop in the mesh network. If the wireless access point 110-1 determines that the primary parent device 110-2 was not able to receive the message, then the secondary parent device, for example, 110-3, can be used. Then, the parent device that successfully received the message, for example, the primary parent device 110-2 or the secondary parent device 110-3, can pass the message along to its parent in the same manner until the message is received by the fire control panel 130.

As explained above, each wireless access point 110-1, 110-2, 110-3, 110-4, 110-5, 110-6 can maintain low power operation by time synchronizing all of the wireless access points 110-1, 110-2, 110-3, 110-4, 110-5, 110-6 in the system 100. For example, each wireless access point 110-1, 110-2, 110-3, 110-4, 110-5, 110-6 in the system can be assigned a unique time slot for transmitting and receiving messages.

Figure 2:
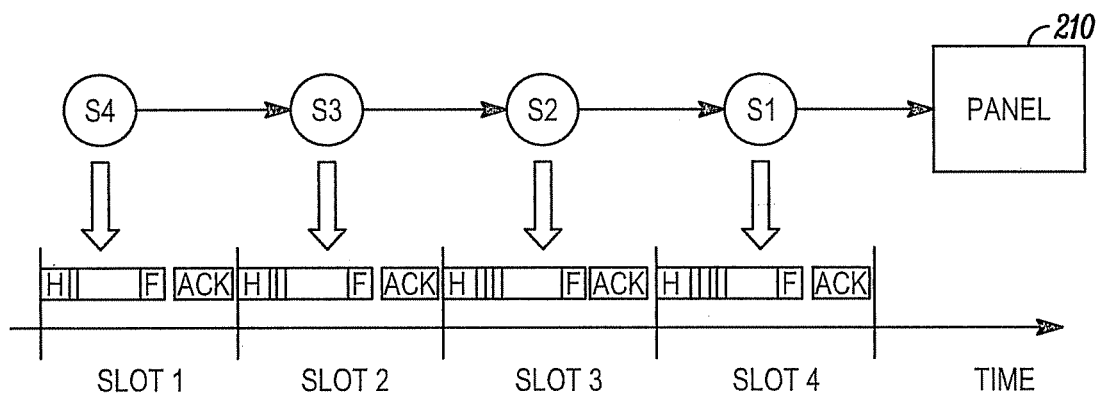
FIG. 2 is a block diagram of time slotted multi-hop communication in accordance with disclosed embodiments.

FIG. 2 is a block diagram of time slotted multi-hop communication in accordance with disclosed embodiments. As seen in FIG. 2, a system can include a plurality of nodes, for example, four nodes S1, S2, S3, and S4. During start up, each node can be assigned a slot for transmission and reception. As seen in FIG. 2, node S4 can be assigned slot 1, node S3 can be assigned slot 2, node S2 can be assigned slot 3, and node S1 can be assigned slot 4.

Each node S1, S2, S3, S4 can operate in a low power sleep state and can postpone transmitting status and alarm messages until the node's respective transmit and/or receive time slot occurs. Following transmission of the message to be transmitted, the node S1, S2, S3, S4, can reenter a lower power sleep state to conserve available power. When the node is in the sleep state for a longer period of time, the node's battery life can also be longer.

In some embodiments, a node S1, S2, S3, or S4 can transmit a packet that can be long enough to include alarm messages and information from all of the other nodes. For example, the packet transmitted by S1 to the panel 210 can include alarm messages from each of S1, S2, S3, and S4.

Figure 3:
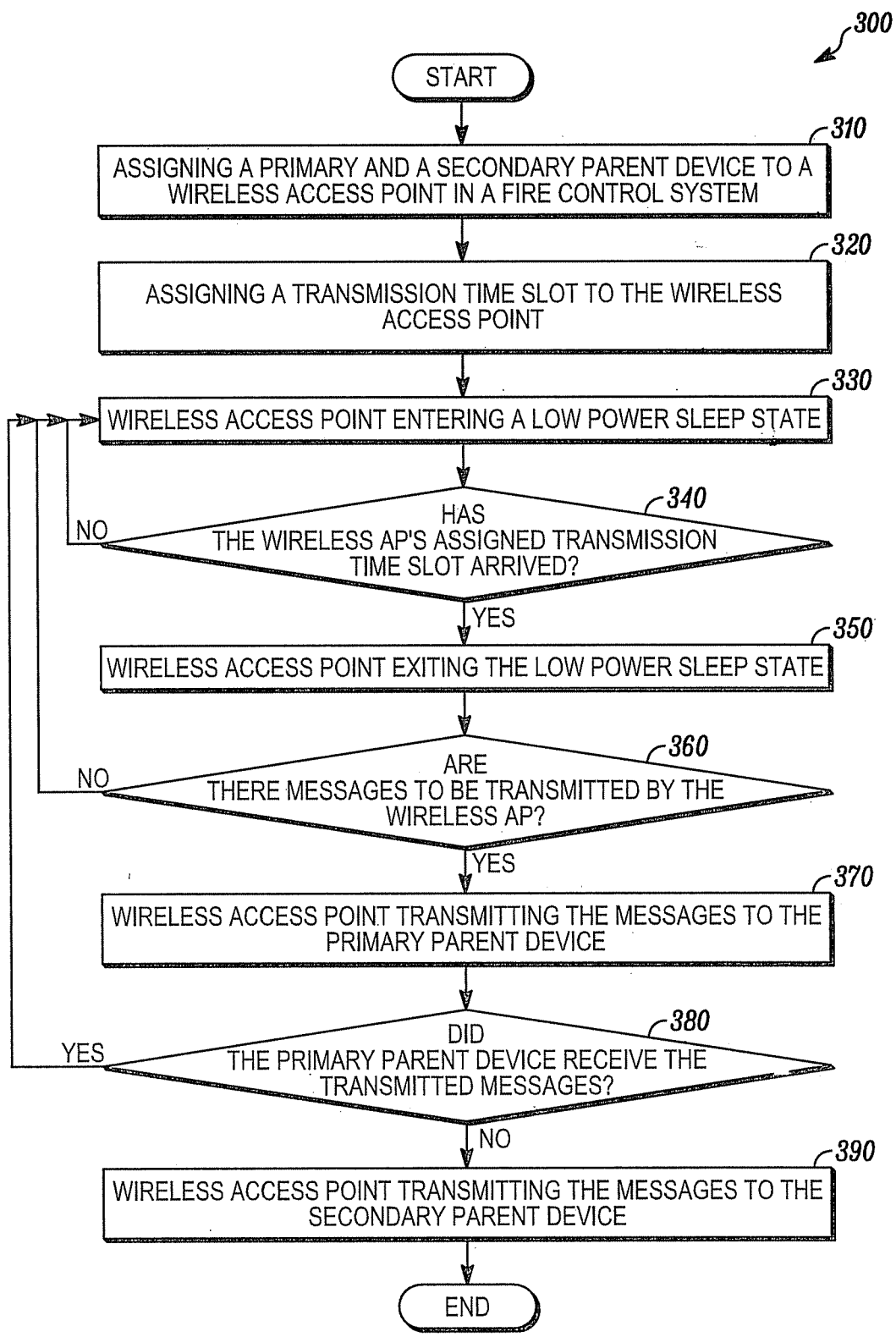
FIG. 3 is a flow diagram of a method in accordance with disclosed embodiments.

FIG. 3 is a flow diagram of a method 300 in accordance with disclosed embodiments. As seen in FIG. 3, the method 300 can include assigning a primary and a secondary parent device to a wireless access point in a fire control system as in 310. The method 300 can also include assigning a transmission and/or reception time slot to the wireless access point as in 320. Then, the wireless access point can enter a low power sleep state as in 330.

As seen in FIG. 3, the method 300 can determine if the wireless access point's assigned transmission and/or reception time slot has arrived as in 340. If not, then wireless access point can remain in a low power sleep state as in 330.

However, when the wireless access point's assigned transmission and/or reception time slot has arrived as in 340, the wireless access point can exit the low power sleep state as in 350. Then, the method 300 can include determining if there are alarm or status messages to be transmitted by the wireless access point as in 360. For example, the method 300 can determine if there are messages to be transmitted that have not been transmitted since the wireless access point's last transmission time slot. If not, then the wireless access point can return to the low power sleep state as in 330.

If there are messages to be transmitted by the wireless access point as in 360, then the method 300 can include the wireless access point transmitting the messages to the primary parent device as in 370. The method 300 can determine if the primary parent device successfully received the transmitted messages as in 380, and if the transmission was successful, then the wireless access point can return to the low power sleep state as in 330. For example, in some embodiments, the wireless access point can determine if the primary parent device successfully received the transmitted messages by, for example, determining if an acknowledgement message was received by the primary parent device.

However, if the transmission of messages from the wireless access point to the primary access point was unsuccessful as in 370, then the method 300 can include the wireless access point transmitting the messages to the secondary parent device as in 390. Thus, the failure of the first attempted transmission can be mitigated, and the reliability of the wireless system can be improved.

The method 300 of FIG. 3 and others in accordance with disclosed embodiments can be executed by the system 100 shown in FIG. 1. Alternatively or additionally, at least some steps in the method 300 can be executed by a wireless access point, which can be part of the system 100. For example, FIG. 4 is a block diagram of a wireless access point 400 in accordance with disclosed embodiments.

Figure 4:
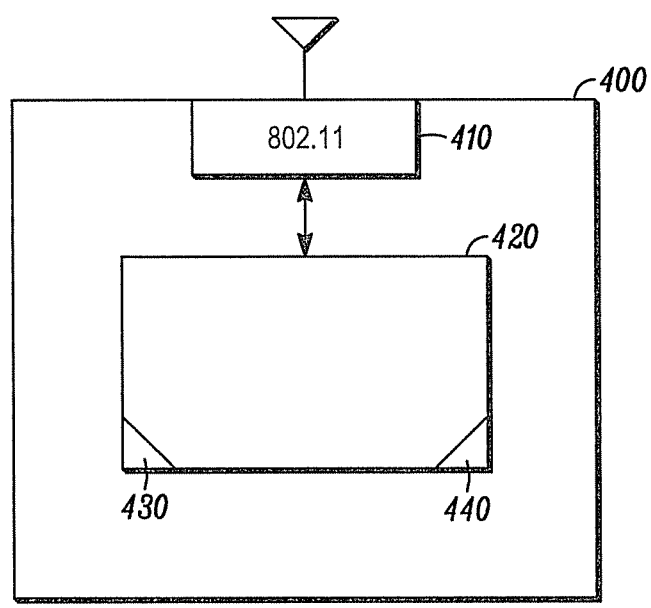
FIG. 4 is a block diagram of a wireless access point in accordance with disclosed embodiments.

As soon in FIG. 4, a wireless access point 400 can include transceiver 410, control circuitry 420, one or more programmable processors 430, and executable control software 440. In some embodiments, the transceiver 410 can include a radio that is adapted to communicate compliant with the IEEE 802.11 standard. The executable control software 440 can be stored on a transitory or non-transitory computer readable medium, including but not limited to, computer memory, RAM, optical storage media, magnetic storage media, flash memory, and the like. In some embodiments, the executable control software 440 can execute at least some steps of the method 300 shown in FIG. 3 as well as others disclosed herein.

For example, the executable control software 440 can use the transceiver 410, the control circuitry 420, and the processors 430 to solicit and/or identify primary and secondary parent devices, to solicit and/or identify the wireless access point's assigned transmission and/or reception time slot, to place the wireless access point in a low power sleep state, to remove the wireless access point from the low power sleep state, to determine when to exit the low power sleep state, to determine messages to be transmitted, to transmit messages to the primary and/or secondary parent device, and to determine if transmission attempts were successful, for example, by determining if an acknowledgement message was received within a predetermined period of time.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A system comprising:
 a plurality of access points of a time-synchronized network,
  wherein each of the plurality of access points is assigned at least one respective transmission time slot and at least one respective reception time slot,
  wherein each of the plurality of access points postpones transmitting messages by entering a low power sleep state until its at least one respective transmission time slot and at least one respective reception time slot within the time-synchronized network occurs, wherein each of the plurality of access points enters the low power sleep state at times outside of the at least one respective transmission time slot and the at least one respective reception time slot of a respective one of the plurality of access points, wherein each of the plurality of access points is wirelessly connected to at least two other access points in the plurality of access points, wherein a first access point in the plurality of access points is assigned as a primary parent device to a third access point in the plurality of access points, wherein a second access point in the plurality of access points is assigned as a secondary parent device to the third access point, wherein the third access point determines whether the third access point has a transmission message to transmit during the at least one respective transmission time slot, wherein the third access point performs a first attempt to transmit the transmission message to the primary parent device when the third access point determines that the third access point has the transmission message to transmit during the at least one respective transmission time slot, wherein the third access point transmits the transmission message to the secondary parent device when the third access point determines that the third access point failed to receive a first acknowledgement message from the primary parent device within a predetermined period of time in response to the first attempt, wherein the third access point determines whether the third access point received a second acknowledgement message from the secondary parent device before returning to the low power sleep state, and wherein the second acknowledgement message indicates that the secondary parent device successfully received the transmission message.

2. The system as in claim 1 wherein at least one of the plurality of access points includes at least one of a wireless sensor, a pull station, and an actuator.

3. The system as in claim 1 wherein each of the plurality of access points is time synchronized with one another.

4. The system as in claim 1 wherein each of the plurality of access points includes a respective radio that is adapted to communicate compliant with an IEEE 802.11 standard.

5. A method comprising:
assigning a respective primary parent device to each access point of a plurality of access points of a time-synchronized network in a fire control system;
assigning a respective secondary parent device to each access point in the fire control system;
assigning at least one respective transmission time slot and at least one respective reception time slot to each of the plurality of access points in the fire control system, wherein each of the plurality of access points postpones transmitting messages by entering a low power sleep state until its at least one respective transmission time slot and at least one respective reception time slot within the time-synchronized network occurs and each of the plurality of access points enters the low power sleep state at times outside of the at least one respective transmission time slot and the at least one respective reception time slot of a respective one of the plurality of access points;
determining whether a first access point in the fire control system has a transmission message to transmit during the at least one respective transmission time slot
performing a first attempt to transmit the transmission message from the first access point to the respective primary parent device;
when the first access point fails to receive a first acknowledgement message from the respective primary parent device within a predetermined period of time in response to the first attempt, transmitting the transmission message from the first access point to the respective secondary parent device; and
determining whether the first access point received a second acknowledgement message from the respective secondary parent device before returning to the low power sleep state,
wherein the second acknowledgement message indicates that the respective secondary parent device successfully received the transmission message.

6. The method of claim 5 further comprising the first access point exiting the low power sleep state when the at least one respective transmission time slot or the at least one respective reception time slot occurs.

7. The method of claim 5 wherein transmitting the transmission message from the first access point to the respective primary parent device and transmitting the transmission message from the first access point to the respective secondary parent device includes transmitting alarm or status information regarding the first access point.

8. The method of claim 5 further comprising, after the first access point receives the first acknowledgement message from the respective primary parent device, the first access point entering the low power sleep state.

9. The method of claim 5 further comprising, after the first access point receives the second acknowledgement message from the respective secondary parent device, the first access point entering the low power sleep state.

10. An access point of a time-synchronized network comprising:
a transceiver;
control circuitry;
at least one programmable processor; and
executable control software stored on a non-transitory computer readable medium for:
identifying a primary parent device during start-up of the access point;
identifying a secondary parent device during start-up of the access point;
assigning at least one transmission time slot and at least one reception time slot to the access point, wherein the at least one programmable processor postpones transmitting messages by entering a low power sleep state until its at least one respective transmission time slot and at least one respective reception time slot within the time-synchronized network occurs and wherein the at least one programmable processor enters the low power sleep state at times outside of the at least one respective transmission time slot and the at least one respective reception time slot;
determining whether the access point has a transmission message to transmit during the at least one transmission time slot;
performing a first attempt to transmit the transmission message to the primary parent device;

determining when a first acknowledgement message from the primary parent device is not received within a predetermined period of time in response to the first attempt;

when the first acknowledgement message from the primary parent device is not received within the predetermined period of time in response to the first attempt, transmitting the transmission message to the secondary parent device; and determining whether the access point received a second acknowledgement message from the secondary parent device before returning to the low power sleep state, wherein the second acknowledgement message indicates that the secondary parent device successfully received the transmission message.

11. The access point of claim 10 wherein the transceiver includes a radio that is adapted to communicate compliant with an IEEE 802.11 standard.

12. The access point of claim 10 wherein the executable control software removes the transceiver, the control circuitry, and the at least one programmable processor from the low power sleep state.

13. The access point of claim 12 wherein the executable control software removes the transceiver, the control circuitry, and the at least one programmable processor from the low power sleep state when the at least one transmission time slot or the at least one reception time slot occurs.

14. The access point of claim 13 wherein transmitting the transmission message to the primary parent device and transmitting the transmission message to the secondary parent device occurs during the at least one transmission time slot.

15. The method of claim 5 further comprising:

the first access point receiving another message from a second access point before the first access point transmits the transmission message; and the first access point transmitting a third acknowledgement message to the second access point indicating reception of the another message, wherein the transmission message from the first access point to the primary parent device includes information included in the another message.

* * * * *